Aug. 14, 1951 J. R. HICKS 2,564,305
BUOYANCY RESPONSIVE APPARATUS
Filed Jan. 31, 1945

INVENTOR.
James R. Hicks
BY E. C. Sanborn
Attorney

Patented Aug. 14, 1951

2,564,305

UNITED STATES PATENT OFFICE 2,564,305

BUOYANCY RESPONSIVE APPARATUS

James R. Hicks, Waterbury, Conn., assignor to The Bristol Company, Waterbury, Conn., a corporation of Connecticut Application January 31, 1945, Serial No. 575,508

10 Claims. (Cl. 73—319)

This invention relates to float gauges, and more especially to a buoyancy responsive device having a moving part immersed in, or otherwise exposed to, a corrosive fluid, and having relatively delicate parts subject to attack by said fluid and thereby to mechanical damage or loss of accuracy. A common method of measuring the level or density of liquid involves the use of a float member more or less immersed in a body of said liquid and constrained for limited displacement in a vertical sense with changes in buoyant force due to variation in density or surface level of said liquid. Devices of this nature are especially applicable to the determination of liquid conditions in an enclosed container which, because of pressure, or chemical conditions, is required to be isolated from the surrounding atmosphere. In such cases, the limited displacement of the float in response to relatively large changes in the buoyant effect of the liquid is readily transmittable to the exterior of the container for purposes of measurement and/or control, through the medium of a fluid-tight transmitting member. While a considerable variety of such transmitting members is known to those versed in the art, a preferred form is found in the device fully disclosed and set forth in co-pending application Serial No. 483,824 filed by the present inventor April 20, 1943, now Patent No. 2,441,882, dated May 18, 1948; and, without, however, so restricting the construction, it is to that form of transmitting device that the present invention is primarily directed.

It is an object of the present invention to provide means whereby flexible, jointed, or otherwise delicate parts, required to be enclosed in a float gauge or the like, may be protected from exposure to corrosive or otherwise destructive fluid contained therein.

It is a further object of the invention to provide protective means as above stated which shall be effective without perceptible influence on the accuracy of the measuring device.

It is a further object to provide protective means as above stated which shall be readily removable for examination, adjustment, or repair, of the apparatus, and which shall be as readily replaceable when such work has been completed.

In carrying out the purpose of the invention, it is proposed to provide a float gauge or the like, having those parts which require protection so disposed that they may be permanently immersed in a non-corrosive liquid of higher density than that whose buoyancy is being measured.

Figure 1:
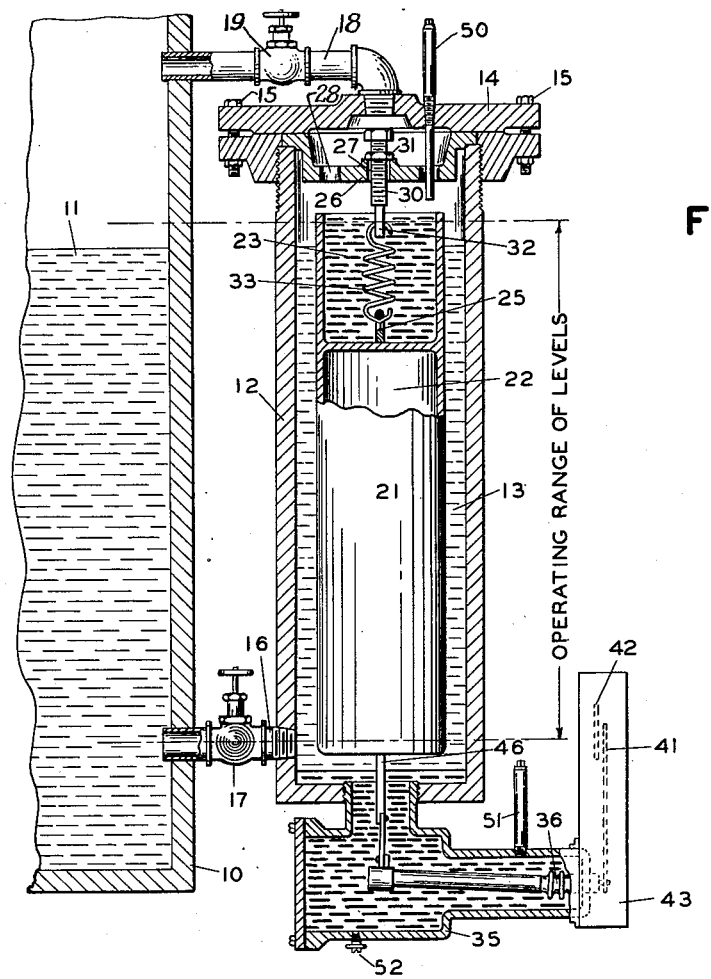
Fig. 1 is a side elevation, partly in section, of a float gauge embodying the principles of the invention.
Figure 2:
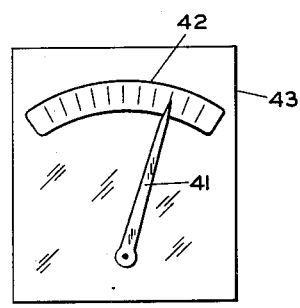
Fig. 2 is a front elevation of an indicating dial adapted for use with said gauge.
Figure 4:
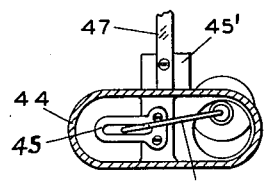
Figs. 3, 4 and 5 are side, end and bottom, elevations respectively, partly in section, of a detail of the invention.
Figure 3:
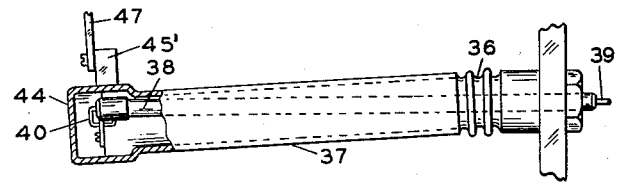
Figure 5:
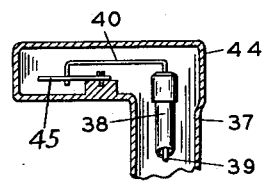

Referring now to the drawings:

The numeral 10 designates a tank or column adapted to contain a body of liquid 11, the level of whose surface it is desired to determine and express as a measurement external to said tank. Vertically disposed adjacent the tank 10 is a float housing 12 comprising a chamber portion 13 and a cover or head portion 14 adapted to be secured thereto as by bolts 15. The lower part of the chamber portion 13 is normally in communication with the interior of the tank 10 through a pipe or conduit 16, having therein a valve 17 which may be closed to interrupt said communication. The upper part of the housing 12 is similarly in communication with the interior of the tank 10 through a pipe 18 passing through the head portion 14 and having therein a valve 19 adapted to be closed to interrupt said communication. Pipe 16 will enter tank 10 at or below the minimum liquid level to be measured, and pipe 18 will enter tank 10 at or above the maximum level to be measured. Thus, with valves 17 and 19 open, liquid will pass freely between the interior of the tank 10 and the chamber 13, and the level of the surface within said chamber will be the same as that of the body of liquid 11. When the valves 17 and 19 are closed, the interior of the housing 12 is isolated from the tank 10 and may be placed in communication with the atmosphere and opened for any desired purpose.

Positioned within the chamber portion 13 of the housing 12 is a float member 21, preferably of cylindrical form and having in its lower portion an enclosed space 22 to impart buoyancy, and in its upper portion a cup-shaped depression 23 open toward the top, and adapted to contain a quantity of liquid. Secured to the body of the float member 21 within the lower part of the cup-shaped depression 23 is a supporting ring 25, preferably counter-sunk from opposite sides to provide a knife-edge bearing. Supported within the upper part of the housing 12, and preferably clamped thereto by the head 14 is a bracket 26 having a centrally disposed aperture 27 and one or more openings 28 to provide free communication between the upper and the lower surfaces respectively of said bracket. Freely passing through the aperture 27 and vertically disposed therein, is a screw 30, having threaded thereon a nut 31 to provide for vertical adjustment of said screw, and terminating at its lower extremity in a ring 32, similar to the ring 25. Extended between the rings 25 and 32 is a tension spring 33 terminated by hook portions adapted to engage said rings without binding, and of such length that the ring 32 will lie within the depression 23 when the float 21 is supported by said spring, and when said float rests in the lowest possible position within its vertical range the top edge of said depression will be above said ring.

Attached to the base of the chamber portion of the housing 12, and communicating therewith through an opening of considerable size is an auxiliary housing 35 adapted to enclose means for both transmitting displacement of the float 21 to exterior instrumentalities and providing a pressure-tight seal between the interior and exterior of said housings. As hereinbefore pointed out, while said sealing and transmitting means may take any one of a number of well known forms, a preferred type is that shown in the aforementioned Patent No. 2,441,882. Secured to a flat vertically disposed surface of the housing 35, and surrounding an aperture therein, is a shell comprising a flexible metallic bellows member 36 and an extended enclosed tubular casing 37 attached to said bellows for rocking motion through a limited angle about a virtual axis lying within the bellows member 36. Secured to the same wall of the housing 35 as said bellows member, and extending therethrough and into the casing 37 is a rigid tubular bearing member 38 having journalled therein a rotatable shaft or spindle 39. The shaft 39 terminates at its inner end in a lever or crank portion 40, and at its outer end carries an index or pointer 41 adapted to provide on a graduated scale 42, mounted within an enclosure 43, a measure of the angular position of said shaft or spindle. Secured within an enlarged head portion 44 at the free extremity of the rockable casing 37 is a horizontally slotted bracket member 45 adapted operatively to engage the crank portion 40 of the spindle 39, whereby to impart to the latter angular deflection corresponding to vertical displacement of said head portion. Since the radius of the crank portion 40 is obviously much less than the radius of deflection of the head portion 44 as the casing 37 rocks about its virtual axis passing through the bellows member 36, it follows that the angle of deflection of the spindle 39 will be proportionately greater than the angle through which the casing 37 moves in its rocking action.

An upwardly projecting lug 45' on the head 44 is disposed in substantial vertical alignment with a downwardly projecting lug 46 on the bottom of the float 21; and a flexible link 47 secured to both said lugs provides an attachment whereby vertical displacement of said float is positively communicated to the head 44 to rock the casing 37 in response to such displacement and thereby correspondingly to rotate the spindle 39. While the principal mechanical force variable with the vertical position of the float 21 to balance the difference between the weight of said float and the buoyant influence of the body of liquid 13 is provided by the spring 33, the stiffness of the bellows member 36 also is appreciable, and may contribute measurably to the balance of forces, and thus to the suspension of the float. The resilient attachment of the lower end of the float to the wall of the housing through the casing 37 and associated parts also serves as a guide to said float, constraining its displacement to a substantially vertical path.

Through the head 14 passes a vertically disposed filling pipe 50 having a suitable plug, and adapted for admitting sealing liquid, of a nature presently to be set forth, to the cup-shaped depression 23. A vertically disposed filling pipe 51, penetrating the wall of the auxiliary housing 35, extending to a level slightly above the bottom of the chamber 13, and adapted for closure by a plug, provides for admission to said auxiliary housing of a suitable sealing fluid, whose level may be positively established by that of the top extremity of said filling pipe. A drain plug 52 threadedly inserted in the lower part of the auxiliary housing 35 provides for the removal of liquids contained within said auxiliary housing and in the chamber portion 13 of the main housing 12.

It will be apparent that a liquid completely filling the depression 23 in the upper part of the float 21 will immerse both ends of the spring 33, and similarly, a liquid filling the auxiliary housing 35 and the lower part of the chamber portion 13 to the level of the top of the filling pipe 51 will immerse the bellows 36, the rockable casing 37, the lower end of the lug 46, and all intervening parts. Thus, if the main body of liquid, whose buoyant effect upon the float 21 is to be determined, be of a density less than that of the sealing liquid, and immiscible therewith, the only moving part of the measuring unit to be exposed to contact with said main liquid body will be the float 21.

Since the principal object of the present invention lies in the protection of delicate moving or connecting parts from attack by corrosive, or otherwise destructive, fluids it is obvious that consideration must be given to the materials of the solid parts in relation to the fluids involved in the measurement, and also to the selection of the sealing liquid in relation to said fluids and to said solid parts. The tank or container 10, the float housing 12, together with interconnecting pipes and valves, must, of course, be immune to attack by the contained liquid, or by such vapors as may occupy the space thereabove; and, with the great variety of structural and coating materials now available, that problem (forming no element in the present invention) may be solved according to accepted methods. The float 21 may be formed of a material not subject to attack by those fluids with which it may come in contact, or may be protected by a suitable metallic plating or other protective coating. Again, the float being of relatively simple shape, may be formed of glass or ceramic material suitable for exposure to destructive fluids.

The supporting and calibrating spring 33, being necessarily of critical dimensions, must not be exposed to any influence which would affect those dimensions or change the metallurgical condition of its surface. Also, in the interests of accuracy the suspensions of the spring must not be subjected to such progressive change in form or dimensions as would attend continued exposure to a corrosive medium. By the total immersion of the spring 33, and its attachments, in the sealing liquid within the depression 23; these delicate elements are protected from contact with any medium except said sealing liquid.

The parts contained within the auxiliary housing 35 include the bellows member 36, which must be of relatively thin-walled construction selected from a rather limited variety of suitable materials, which may not include a metal adapted to the purpose and at the same time immune to attack by the fluids under measurement, which limitation also applies to the connecting link 47. In fact, all the surfaces of the rockable structure and associated elements may be unsuited to such exposure. By the complete filling of the auxiliary housing 35 with an inert liquid extending upward into the lower part of the main housing, these parts are protected from contact with any medium except said liquid. While, so long as the surface of the liquid under measurement does not reach above the rim of the cup-like depression 23, the density of the sealing liquid used therein is of little importance, it being necessary only that said liquid protect the spring 33 and its abutments against attack by such vapors as may occupy the space above the former liquid; yet, because of the possibility of the liquid under measurement, splashing, surging, or otherwise momentarily causing the float to be totally immersed, it is preferable that the liquid used in the upper part of the float be the same as that used in the auxiliary housing 35. This practice, moreover, has the advantageous feature of facilitating filling, in that it is only necessary to admit sealing liquid through the pipe 50 until said liquid overflows, and sinks to join the lower body of liquid, whose level may be finally established by the height of the filling pipe 51.

As hereinbefore pointed out, the liquid in the auxiliary housing 35 must be not only of such a nature as to have no undesirable effects upon the relatively delicate parts immersed therein, but must have a density greater than that of the liquid whose buoyancy is under measurement, and also be immiscible therewith. Examples of corrosive liquids likely to be encountered in the class of measurement under consideration, together with suitable sealing liquids, and associated metallic materials, are given in the following tabulation:

| Liquid being measured | Container and float | Sealing liquid | Parts in Sealing Liquid |
| --- | --- | --- | --- |
| Corrosive oil | Monel | 50% solution of ethylene glycol (Prestone) in water. | Bronze, Brass, or Steel. |
| Caustic solutions | Iron or steel | Carbon tetrachloride. | Do. |
| Phenol | Monel | Mercury | Iron or Steel. |

While the buoyancy-responsive device embodying the principles of the invention has been shown specifically in its application to the measurement of liquid level, it will be apparent that modification of structure and connections in such a manner as to render the apparatus adaptable to the determination of liquid density, or to any other purpose wherein the phenomenon of variable buoyancy is involved, will in no way depart from the spirit of the invention.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A buoyancy-responsive device comprising a chamber adapted to contain a liquid, a float therein, means for admitting to said chamber a buoyant liquid whose buoyancy is to be determined, receptacle means in free communication with said chamber, resiliently yielding suspension means positioned in said receptacle means and cooperating with said float to establish a mechanical stress relation between the same and said chamber, said receptacle means containing a liquid of higher density than said buoyant liquid for immersing said suspension means.

2. Apparatus responsive to the buoyancy of a liquid, said apparatus comprising a housing adapted to contain said liquid, a float in said housing, means for admitting said liquid to said housing, a shell mounted in said housing, means connecting said shell and said float for transmitting movements of said float to said shell, said shell having a flexible portion for facilitating movement thereof by said connecting means, means comprising a body of another liquid immersing said flexible portion of said shell for protecting the latter against corrosive effects of the first-mentioned liquid, an element external to said housing, and means connected to said shell for transmitting movement therefrom to said external element.

3. Apparatus responsive to the buoyancy of a liquid, said apparatus comprising a housing adapted to contain said liquid, a float in said housing, means for admitting said liquid to said housing, a shell mounted in said housing, means connecting said shell and said float for transmitting movements of said float to said shell, said shell having a flexible portion for facilitating movement thereof by said connecting means, means comprising a liquid surrounding said flexible portion and of higher specific gravity than the first-mentioned liquid for shielding said flexible portion from corrosive effects of said first mentioned liquid, an element external to said housing, and means connected to said shell for transmitting movement therefrom to said external element.

4. In a buoyancy gauge for use with a destructive liquid, a container for a body of said liquid, a float in said container and vertically displaceable with changes in the buoyant effect thereof, resilient supporting means connected between a part of said container and the upper part of said float, an element movable to positions indicative of the positions of said float, solely mechanical means interposed between said float and said element for operating the latter in response to changes in position of the former, receptacle means movable with said float and surrounding said resilient supporting means for immersing the latter in a non-destructive liquid to isolate said supporting means from exposure to said destructive liquid, and stationary receptacle means surrounding said operating means for immersing the latter in a non-destructive liquid to isolate said operating means from exposure to said destructive liquid.

5. In a gauge for measuring the buoyancy of a destructive liquid, a container for a body of said liquid, a float in said container and vertically displaceable with changes in the buoyant effect of said liquid, an element movable in response to movement of said float to positions indicative of the float positions suspension means providing a yieldable connection between the upper part of said float and a part of said container, and means for isolating said suspension means from said destructive liquid, comprising chamber means on the upper part of said float, and a body of non-destructive liquid in said chamber means and surrounding said suspension means.

6. In a gauge for measuring the buoyancy of a destructive liquid, a container for a body of said liquid, a float in said container and vertically displaceable with changes in the buoyant effect of said liquid, an element movable in response to movement of said float to positions indicative of the float positions suspension means providing a yieldable connection between the upper part of said float and a part of said container, and means for isolating said suspension means from said destructive liquid, comprising chamber means on the upper part of said float, and a body of non-destructive liquid in said chamber means and surrounding said suspension means, and conduit means extending from a point outside said container to a point within the same and above said chamber means for enabling the latter to be supplied with said non-destructive liquid.

7. In a gauge for measuring the buoyancy of a destructive liquid, a container for a body of said liquid, a float in said container and vertically displaceable with changes in the buoyant effect of said liquid, an element movable in response to movement of said float to positions indicative of the float positions suspension means providing a yieldable connection between said float and said container, and means for isolating said suspension means from said destructive liquid, comprising chamber means in communication with the interior of said container and surrounding said suspension means, and a body of a non-destructive liquid in said chamber in which said suspension means is immersed, said non-destructive liquid being immiscible with said destructive liquid and of higher density but contributing substantially nothing to the buoyant support of said float.

8. In a buoyancy gauge for use with a destructive liquid, a container for a body of said liquid, a float in said container and vertically displaceble with changes in the buoyant effect of said liquid only, an element movable to positions indicative of positions of said float, mechanical means interposed between said float and said element for operating the latter in response to change in position of the former, and means for isolating said operating means from said destructive liquid, comprising resilient sealing means and receptacle means in communication with the interior of said container and surrounding said sealing means, and a body of non-destructive liquid in said receptacle means and submerging said sealing means, said non-destructive liquid being immiscible with, and of higher density than, said destructive liquid, and having a common interfacial surface therewith.

9. A buoyancy-responsive device comprising a chamber adapted to contain a liquid, a float therein, means for admitting to said chamber a buoyant liquid whose buoyancy is to be determined, receptacle means in free communication with said chamber, resiliently yielding suspension means positioned in said receptacle and cooperating with said float, and a non-destructive liquid of higher density than said destructive liquid and positioned in said receptacle for immersing said suspension means at all times throughout the range of movement of said float.

10. A buoyancy-responsive device comprising a housing adapted to contain a liquid, a float therein, means for admitting to said housing a buoyant liquid whose buoyancy is to be determined, a movable indicator exterior to said housing, a resiliently yieldable sealing attachment between said float and said housing and including means for transmitting proportionate displacement from said float to said indicator, and liquid means in said housing contributing substantially nothing to the buoyant effect upon said float and immersing said yieldable sealing attachment, but sealed thereby from communication with exterior space, said last-mentioned liquid being immiscible with the first-mentioned liquid and of higher density, and having a common free interface therewith.

JAMES R. HICKS.

REFERENCES CITED

The following references are of record in the file of this patent:

UNITED STATES PATENTS

| Number | Name | Date |
|---|---|---|
| 1,717,051 | Marshall | June 11, 1929 |
| 1,753,803 | Pew | Apr. 8, 1930 |
| 1,827,560 | Binckley | Oct. 13, 1931 |
| 2,069,959 | Kuljian | Feb. 9, 1937 |
| 2,235,064 | Cloud | Mar. 18, 1941 |
| 2,248,322 | Annin | July 8, 1941 |

FOREIGN PATENTS

| Number | Country | Date |
|---|---|---|
| 591,876 | France | Apr. 18, 1925 |
| 811,439 | France | Aug. 21, 1938 |